Feb. 8, 1966    E. A. WORDEN    3,234,394
ANGULAR DISPLACEMENT ENCODER WITH PHOTOELECTRIC PICKOFFS
AT DIFFERENT RADIAL AND ANGULAR POSITIONS
Filed July 10, 1962                2 Sheets-Sheet 1

INVENTOR.
EDSON A. WORDEN
BY
OSTROLENK, FABER, GERB & SOFFEN
ATTORNEYS

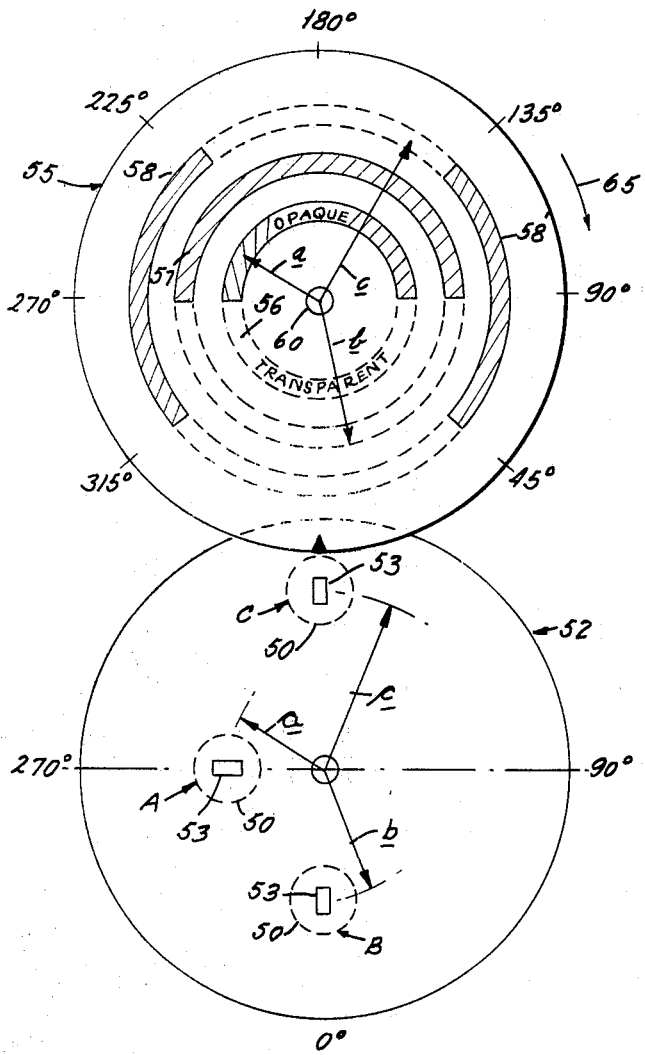

United States Patent Office 3,234,394
Patented Feb. 8, 1966

3,234,394
ANGULAR DISPLACEMENT ENCODER WITH PHOTOELECTRIC PICKOFFS AT DIFFERENT RADIAL AND ANGULAR POSITIONS
Edson A. Worden, Forest Hills, N.Y., assignor to Kollsman Instrument Corporation, Elmhurst, N.Y., a corporation of New York
Filed July 10, 1962, Ser. No. 208,818
2 Claims. (Cl. 250—237)

This invention relates generally to digital encoders, and more particularly to novel compact low torque, low inertia digital encoders for translating sensitive angular displacements.

The angular outputs or "readings" of instrument mechanisms of low torque would be in error if attached to encoders of prior construction. Diaphragm actuated pressure mechanisms, as for altitude, airspeed, etc., give low torque, low displacement outputs. The present invention is directed to provide a novel, accurate, effective compact digital encoder, attachable to low torque outputs, that gives remote electrical digital information or signals.

The encoder of the present invention comprises a light weight code disc that is coupled with the mechanism output, and a series of photoelectric cells in unique radial array opposite the code disc. The cells are compactly arranged at individual angles and radial distances to co-act with a coaxial coded pattern on the disc. The resultant digital signal read-out of the output's angular position is precise and unambiguous the full equivalent of a linear or in-line array of the photocells.

It is accordingly an object of the present invention to provide a novel disc encoder of low torque, low inertia.

Another object of the present invention is to provide a novel disc encoder relatively compact and light in weight.

A further object of the present invention is to provide a novel disc encoder with a plurality of photoelectric cells in unique radial array with respect to a concentrically coded disc.

These and other objects, features and advantages of this invention will become more apparent from the following description of an exemplary embodiment thereof, illustrated in the drawings, in which:

FIGURE 3 is a schematic diagram illustrating the principles of the present invention.

Figure 2:
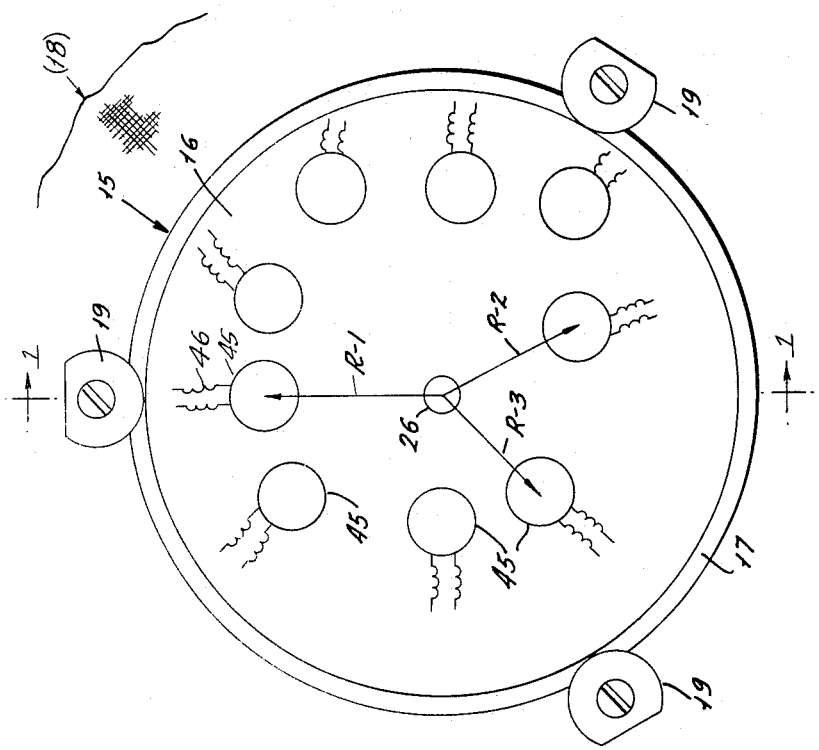
FIGURE 2 is the rear view of the encoder of FIGURE 1.

The encoder 15 is contained in a cylindrical housing 16. Housing 16 has an annular flange 17 which is used to adjustably secure the encoder 15 to the face 18 of the instrument (not shown) to be "read." For this purpose, three clamps 19, 19 are used. The code disc 20 is concentrically mounted in housing 16 on hub 21 of coupling shaft 22. Disc 20 is transparent, as of glass, containing the concentric digitally coded regions, as will be set forth hereinafter.

Code disc 20 is thus rotated by shaft 22, in turn pivoted through jewelled bearings 23, 24 to minimize rotational friction. A mask 25 is secured to the inner base of housing 16, preferably by sweat soldering. The distance between disc 20 and mask 25 of the exemplary encoder is of the order of 0.005" to 0.010"; adjusted through pivot 26 and set-screw 27. End play in the jewels is removed through adjustable plate 28 carrying bearing 24.

If desired, a pointer 22a can be attached to shaft 22 through bearing 26, as schematically illustrated by dotted lines, and can sweep a calibrated surface on housing 16 to afford a visual reading of the position of shaft 22.

A number of lamp assemblies 33 are mounted within housing 16, in a radial array opposite the predetermined array of photoelectric cells 45, as will be described hereinafter. Each assembly 33 contains a lamp 35 within a shield or lamp guard 36, mounted in lamp support 37 of composition material. Supports 37 are secured to mounting disc 38 by suitable bolts 39. Mounting disc 38 is fastened to suitable bosses in housing 16 by screws 40. The base 34 for each lamp 35 has an external rim and spring clip 42. Wire leads 43 conduct current to the lamps 35.

Cylindrical photo-electric cell units 45, in insulated unitary form, are inserted and secured in the base of housing 16, each in line with its associated lamp 35. The photo-sensitive ends of cells 45 are adjacent slots in the mask 25 (see FIGURE 3). The end face of each lamp guard 36 contains an aperture 44 for a beam directed to its cell 45 through the coded disc 20 and mask 25. Each cell 45 has an individual radial position along rotatable code disc 20, and is associated with a corresponding individual annular or circumferentially coded region 47, 47' of the disc 20 (see FIGURE 3).

Whenever light is passed through code disc 29 to a cell 45, its conductivity is enhanced, and an output signal passed to its leads 46. The annular zone 47, 47' on disc 20 are coded by areas of opaqueness and transparency. A small aperture 48, 48' is made in the mask 25 in line with the lamp guard apertures 44 and the associated photocells 45. Thus, when an opaque area 47, 47' is interposed between a lamp 35 and a cell 45, its conductivity is at the circuit minimum. In this manner each cell 45, 45 individually and independently translates the predetermined coded opaque and transparent signals on the disc 20. The composite simultaneous output of all the cells 45 is thus directly translated as digitalized data on the rotational input to gear 30, as will now be understood by those skilled in the art.

The location of associated cells 45, lamps 35, lamp guards 36 and apertures 44, 48 are at different angles and different radial distances R-1, R-2, R-3, etc.; instead of the prior art in-line method with all at the same angle and different radial distances. This permits the use of larger lamps and photo-cells than for an in-line array. The radial distance (R) of each group is determined by the zones in the pattern on the code disc 20 and the opaque separation of the zones. The angular position is determined by the placing of elements to give the same "readout" as if they were in-line, by virtue of the repeatability of the pattern of each zone. The pattern used on the disc, may be any suitable one, as the Gray code (inverted binary) which eliminates switching ambiguity by switching one photosensor at a time with angular displacement.

The radial length of each aperture is determined by the zone 47 radial distance. The angular width of each aperture 48 is determined by the angular width of the least or smallest count on the code disc 20. To give the resolution required, this angular width must be less than half that of the least count on the code disc pattern when utilizing the Gray code. It is desirable to use one-quarter of the angle to provide good resolution and a sharp rise in the photo-sensor's signal with angular displacement.

In determining the least count of the encoder 15 which is the smallest increment of pressure which it will sense, the angular output of the instrument mechanism is determined, linearized to the desired output shaft rotation in terms of altitude, airspeed, etc., then divided by the number of counts throughout the mechanism range. The full angular shaft output must, to avoid ambiguity, be less than 360°. The least count therefore determines the scale factor. In use, this scale factor, multiplied by the output count yields the altitude, airspeed, etc. To shift the zero or starting point of the output, all that is required is to loosen the three clamps 19 holding the housing 16 to the face 18 of the mechanism, and rotate the encoder housing 16 to the desired position and tighten the clamps.

FIGURE 3 is a schematic diagram of a simplified three-element encoder illustrative of the principles of the invention system. The exemplary encoder 16 employs nine basic elements, i.e., cells 45 and coded annular zones 47 on code disc 20. It is to be understood that more or fewer "zones" may be used in a particular design, dependent upon the input-output signal translation desired. Instead of the Gray code, other repetitive codes, as "Datex" may be used. Angular offset of the "zones" namely of the annular zones, 47 and their associated cell 45 positions, results in the photo-sensors 45 acting as if they were "in-line."

The resultant photo-cell code output is accordingly identical to the more cumbersome, bulky in-line system. Ready replacement of the cells 45 is accomplished without disturbing code disc-mask alignment. Larger cells and lamps are useable without disturbing compactness of the encoder 15 diameter, as close spacing of the coded annular zones 47 is utilized.

In FIGURE 3 the photo-electric cells 50 are at any desired individual angular and radial positions A, B, C about the encoder axis 51. Their respective radial extents are a, b, c. A mask 52 shields the cells 50 from all light except through their adjacent small rectangular apertures 53, in radial orientation. Closely spaced from mask 52 is the transparent code disc 55 (see FIGURE 1). On disc 55 are the individually coded opaque annular zones 56, 57, 58–58′ for the respective cell positions A, B, C. The lamps associated with cells 50 are opposite the zones 56, 57, 58–58′ in the manner of lamps 35 of FIGURE 1.

The three "zones" of FIGURE 3 provides a "three bit" encoder capable of differentiating light angular positions of the code disc 55 and of the input shaft 60 secured therewith. An understanding of the encoder electrical digital operation is now clear: Each opaque zone 56, 57, 58–58′ impedes light to the cells 50 and may be set as code "0," with minimum conductivity. When the corresponding "inbetween" transparent zones are opposite any cell, a maximum conductivity signal occurs in it, set as code "1."

The Gray code result of the "three-bit" system for tracks A, B, C, corresponding to the angular rotation in 45° sectors, is as follows:

| Sector | A | B | C |
|---|---|---|---|
| 0–45° | 0 | 0 | 0 |
| 45–90° | 0 | 0 | 1 |
| 90–135° | 0 | 1 | 1 |
| 135–180° | 0 | 1 | 0 |
| 180–225° | 1 | 1 | 0 |
| 225–270° | 1 | 1 | 1 |
| 270–315° | 1 | 0 | 1 |
| 315–360° | 1 | 0 | 0 |
| 0–45° | 0 | 0 | 0 (cycle repeats) |

The rotational direction of code disc 55, for increasing function output per above table is indicated by arrow 65.

Figure 1:
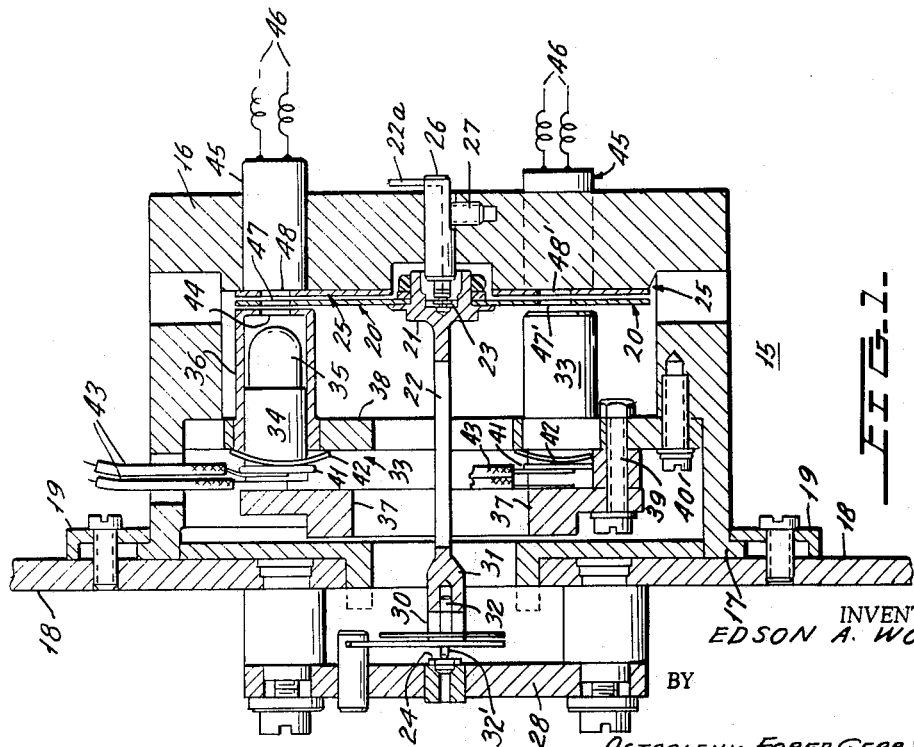
FIGURE 1 is a cross-sectional view through the exemplary encoder, taken along the line 1—1 of FIGURE 2.

The exemplary encoder 15 had a housing 16 with an overall diameter within 2 inches, containing as many as nine "channels." It used photo-sensors 45 one-quarter of an inch in diameter, in a distinctive radial array, as shown in FIGURES 1 and 2. An "in-line" system would require a housing over five inches in diameter with very poor space factor. No physical interference is encountered among the cells 45, the lamps 35 or other components, making for ruggedness and simple servicing.

Although the present invention has been described in connection with the exemplary embodiment, it is to be understood that it may take other forms and arrangements that fall within its broader spirit and scope as defined in the appended claims.

What is claimed is:

1. A rotary digital encoder comprising a cylindrical housing, a plurality of photo-electric devices supported in said housing in individual radial array with respect to the encoder axis, a mask secured in the housing containing a light transmitting aperture opposite each of said devices, a lamp mounted adjacent each of said apertures for directing a beam of light towards each of said devices, and a code disc rotatable between said devices and their respective lamps and containing alternated opaque and transparent individual annular zones in predetermined coded relation to produce a digital electrical signal in said devices in accordance with the angular position of said code disc; each of said light sources, together with an associated photo-electric device, being at different angular positions around said radial array; said photo-electric devices together with their associated mask apertures each having different radial positions at substantially equal increments with respect to the encoder axis as well as different angular orientations about the axis, and the coded annular zones for the respective devices being angularly rotated by an amount equal to the angular position of their associated light sources to provide read-out digital signals in the devices equivalent to an in-line orientation thereof.

2. A device of claim 1 wherein only one photo-electric device is associated with each of said annular zones.

References Cited by the Examiner

UNITED STATES PATENTS

| | | | |
|---|---|---|---|
| 2,537,427 | 1/1951 | Seid et al. | 250—209 X |
| 2,910,684 | 10/1959 | Jones | 250—219 |
| 2,953,689 | 9/1960 | Becker | 250—209 |
| 2,966,673 | 12/1960 | Guernsey | 250—220 X |
| 3,024,986 | 3/1962 | Strainese et al. | 340—347 |
| 3,037,077 | 5/1962 | Williams et al. | 250—209 X |
| 3,043,962 | 7/1962 | Jones | 250—220 |
| 3,058,001 | 10/1962 | Dertouzous | 250—220 X |
| 3,058,005 | 10/1962 | Hurvitz | 250—220 |
| 3,059,116 | 10/1962 | Robertson | 250—209 |
| 3,068,692 | 12/1962 | Morgan | 250—233 X |
| 3,096,444 | 7/1963 | Seward | 250—220 |
| 3,109,101 | 10/1963 | Winter | 250—233 |

RALPH G. NILSON, *Primary Examiner.*

ARCHIE R. BORCHELT, *Examiner.*